United States Patent [19]

Zimmermann

[11] 3,800,196

[45] Mar. 26, 1974

[54] ELECTRONIC CONSTANT-TENSION TAPE-HANDLING SYSTEM

[75] Inventor: Ernest F. Zimmermann, Buffalo Grove, Ill.

[73] Assignee: Ampex Corporation, Redwood City, Calif.

[22] Filed: Mar. 1, 1972

[21] Appl. No.: 230,770

[52] U.S. Cl. .......... 318/6, 318/328, 318/313

[51] Int. Cl. .......... H02d 5/32; B65h 59/38

[58] Field of Search .......... 318/6, 313, 328

[56] References Cited

UNITED STATES PATENTS

| | | | |
|---|---|---|---|
| 3,600,654 | 8/1971 | Yasutake | 318/6 |
| 3,488,696 | 1/1970 | Klang | 318/6 |
| 3,348,107 | 10/1967 | Hamby | 318/6 |
| 3,373,332 | 3/1968 | Olsen | 318/6 X |
| 3,411,055 | 11/1968 | Carter et al. | 318/6 |

*Primary Examiner*—T. E. Lynch

[57] ABSTRACT

An electronic system for maintaining substantially constant tape tension in a tape transport having a motor-driven take-up and/or supply reel comprises an AC torque motor having an externally-variable torque characteristic for driving the tape-handling reel. An apertured disk is attached to the shaft that drives the reel and is positioned between a light source and a photodetector to develop a pulsed optical signal having a repetition rate that varies in accordance with the angular velocity of the reel. The photodetector converts the pulsed optical signal into a corresponding electrical signal. A ramp signal generator is responsive to the pulsed signal for generating a periodic signal with each cycle having a voltage that changes at a constant rate to an extreme or maximum value determined by the repetition rate of the pulsed signal. A sampling circuit applies the maximum voltage to a motor control circuit which regulates the armature voltage of the torque motor to thereby maintain the tension substantially constant as the radius of the tape on the reel varies.

7 Claims, 2 Drawing Figures

ELECTRONIC CONSTANT-TENSION TAPE-HANDLING SYSTEM

Figure 1:
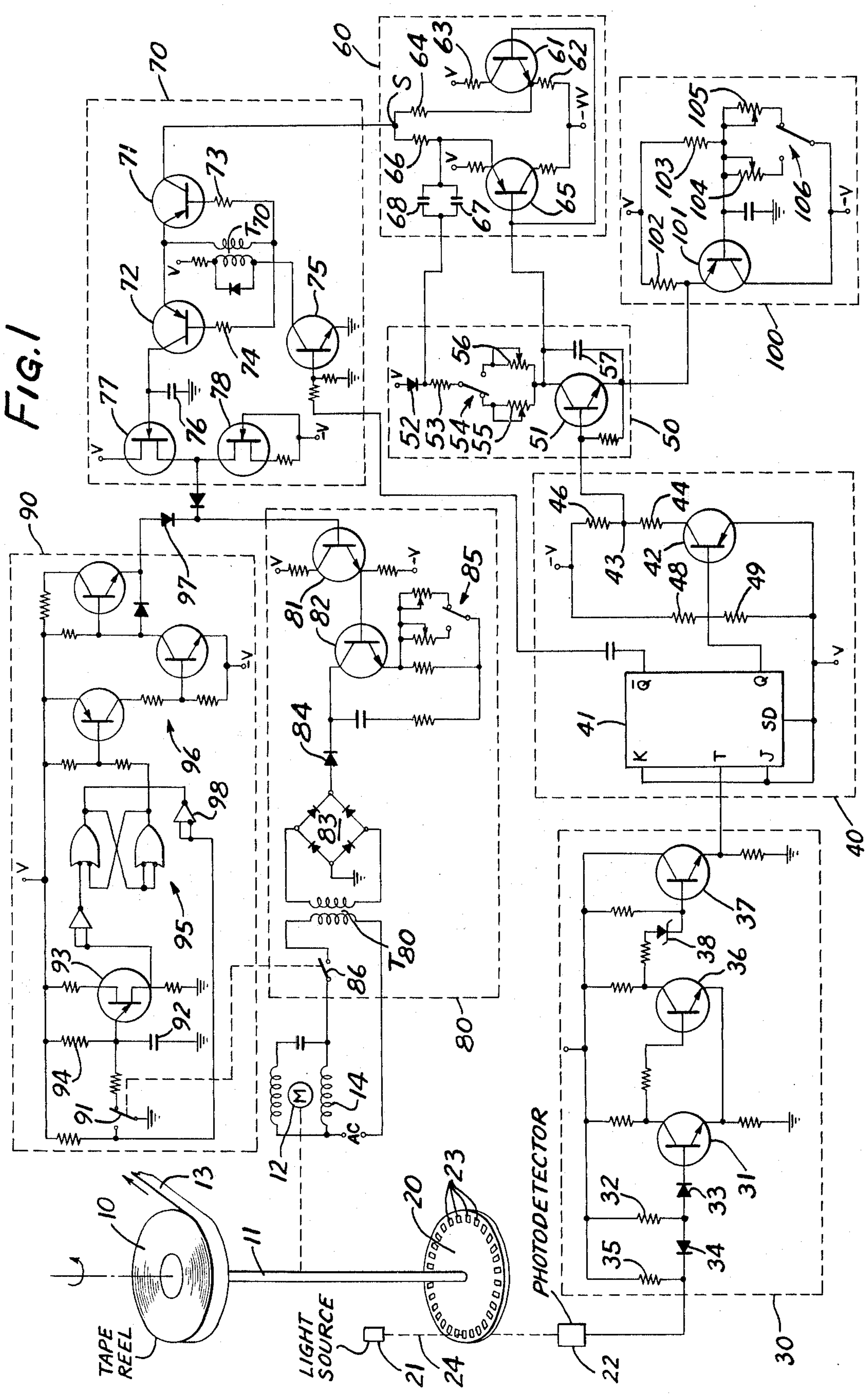

The present invention relates generally to electronic constant-tension tape-handling systems, and particularly to such systems used in reel-to-reel magnetic recording/reproducing devices.

In tape-handling systems, audio, video, and computer, there are various ways in which the tape is supplied to and extracted from the point at which the recording and reproducing occurs. One of the most common tape-handling systems (often referred to as a tape "transport" or "deck") is the so-called "reel-to-reel" system in which the tape is supplied from one reel, moved past one or more recording/reproducing transducers ("heads") by an arrangement of a capstan and a series of tape guides, and taken up on another reel. For uniform transfer and minimum distortion of information, it is generally desirable to move the tape past the head at a uniform rate, which usually requires a constant tape tension. Moreover, maintaining constant tape tension tends to avoid excessive tension which may increase tape wear, distort or even break the tape, and increase the wear on the head and the other parts of the tape transport.

Tape tension may be influenced by various factors including the speed regulation of the reel-driving motor(s) (often referred to as "reeling" motors), the smoothness of operation of the tape transport (capstan, tape guides, etc.), and environmental factors such as temperature and humidity. One of the primary causes of non-uniform tape tension in a reel-to-reel tape transport, however, results from the fact that, as the tape is being wound onto a take-up reel (or unwound from a supply reel) at a constant linear velocity, the rotational or angular velocity of the reel is inversely proportional to the effective reel diameter; that is, as the diameter of the tape on the reel increases, the angular velocity of the reel decreases and vice versa. Thus, in order for the take-up (or supply) motor to apply a constant tension to the tape, the torque that the motor applies to the shaft driving the reel should be directly proportional to the effective reel diameter or, in other words, the speed-torque characteristic of the motor should be hyperbolic.

One conventional and relatively straightforward method for providing uniform tape tension on the tape being unwound from a supply reel is to brake the supply reel with a force that is adjustable to compensate for the fact that, as the tape unwinds from the supply reel, the effective diameter at which the tension is applied to the tape changes. Although the performance of this method may be satisfactory in certain instances it has the inherent disadvantage of increasing friction in the transport, which wastes power, and it is generally not feasible for use with a take-up reel.

Another conventional approach to the problem is to employ a reeling motor having a speed-torque characteristic as close as possible to the desired hyperbolic relationship. Unlike most electrical motors, the speed-torque characteristic of a typical high-efficiency AC induction motor, often referred to as an AC torque motor, very roughly approximates the desired hyperbolic relationship; that is, as the speed of the AC torque motor increases, the torque decreases in a somewhat hyperbolic fashion. Even though by varying the resistance in the armature circuit (and thus the voltage across the armature winding) of an AC torque motor it is possible to improve the approximation, it is still generally not possible to attain the desired hyperbolic characteristic.

In tape recording/reproducing applications where the tension variations present in a system utilizing such an AC torque motor are unacceptable, conventional tape-tension control systems have used some kind of servomechanism employing a feedback control signal representative of the effective tape tension. In general, there are two types of servomechanisms used to control tape tension, "open-loop" and "closed-loop". A typical open-loop system generally detects the radius at which the tape is being supplied to or taken off of the reel in question and then varies the torque supplied by the reeling motor to the shaft of the reel in accordance with a predetermined desired amount. An open-loop system generally does not have feedback features to compensate for unusual conditions which cause random tension variations in the tape. Typical closed-loop systems, on the other hand, detect the actual tape tension and vary the torque accordingly to maintain tape tension within a predetermined range. Closed-loop systems are generally more complex and expensive than open-loop systems but they are sometimes preferred for precision high-speed tape transports.

One disadvantage of most conventional tension control systems, open-loop or closed-loop, results from the method of sensing the effective reel diameter or actual tape tension, which generally presents a mechanical loading to the tape or results in imprecision of detection. Widely-used systems for detecting the effective reel diameter include a mechanical follower resting on the surface of the tape on the reel or shining a light past the reel of tape so that it falls upon a photocell on the far side of the reel where the amount of light transmitted is somewhat detected. Similarly, conventional systems for detecting the actual tape tension include the use of spring-loaded tape idlers, differential pressure measurement in air-lubricated turnaround or guide posts, and the use of a moving guide to control a shutter in a lamp-shutter-photocell system so that the light falling on the photocell varies with guide position. While the above sensing systems may perform satisfactorily in certain applications, they are relatively imprecise or add a certain amount of friction and mass to the transport which, preferably, is to be avoided.

Accordingly, it is an object of the invention to provide an improved electronic constant-tension tape-handling system.

It is another object of the invention to provide such a system which is particularly adaptable to either the supply reel or the take-up reel of a reel-to-reel tape transport, and which presents no mechanical loading to the tape.

It is also an object of the invention to provide such a system which is readily incorporated into an existing tape transport.

Figure 2:
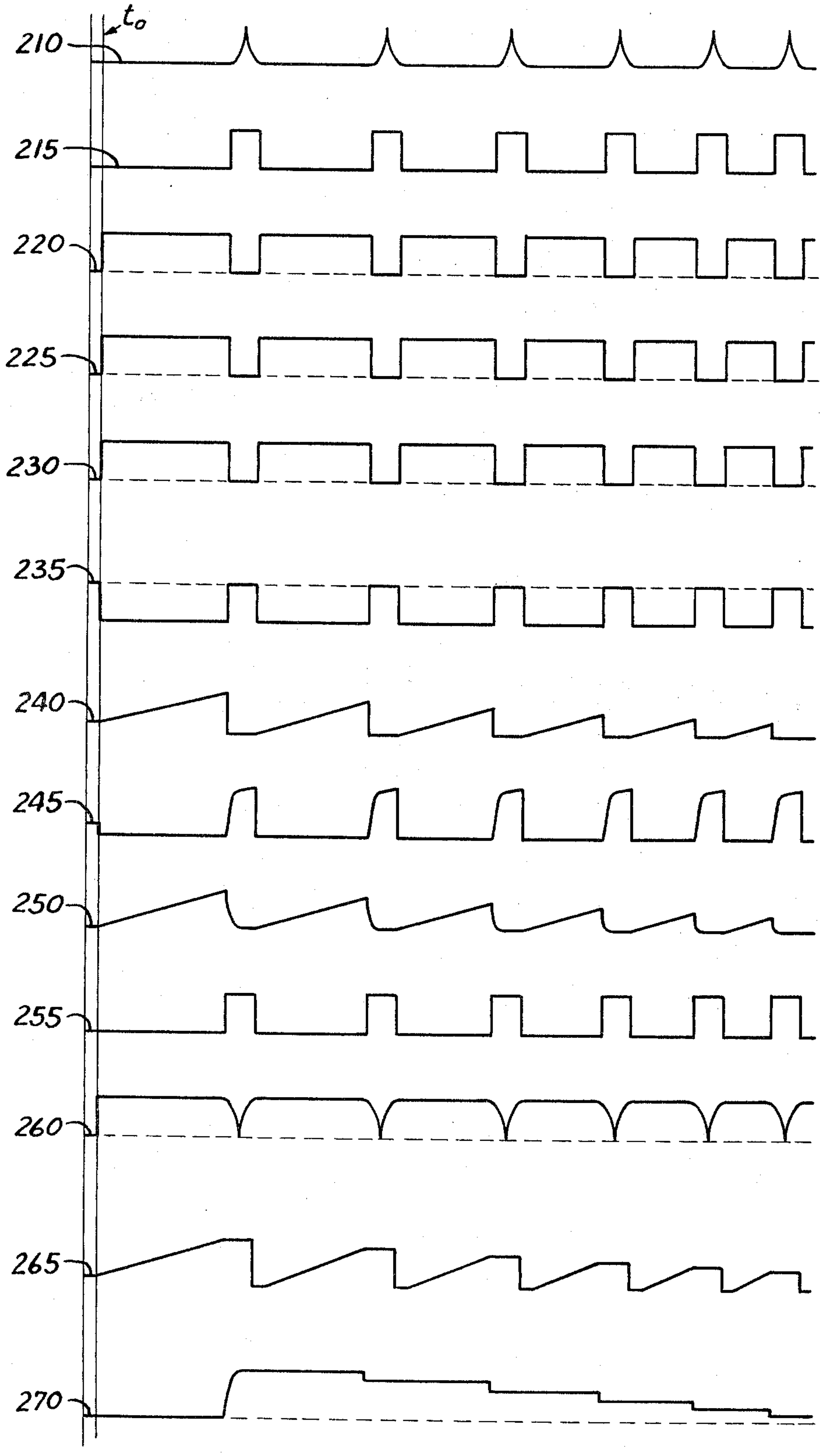

Other objects and advantages of the invention are more particularly set forth in the following detailed description, and in the accompanying drawings of which:

FIG. 1 is an electrical schematic diagram of an electronic constant-tension tape-handling system constructed in accordance with the principles of the invention; and FIG. 2 is a graphic representation of the waveforms of some of the electrical signals in the embodiment of the invention shown in FIG. 1.

With reference to FIG. 1, there is shown an electronic constant-tension tape-handling system constructed in accordance with the principles of the invention and which is particularly suitable for use in a reel-to-reel tape transport (not shown). In general, the system of the invention comprises a motor-driven tape-handling reel 10 mounted on a shaft 11 which is driven by an AC torque motor 12. As illustrated, reel 10 is a supply reel; that is, reel 10 is rotated in the direction of the curved arrow so that the tape 13 is unwound from reel 10 in the direction of the straight arrow. It is understood, however, that the invention is equally applicable to a take-up reel wherein the tape is wound upon a reel such a reel 10. Sensing means for developing an electrical signal corresponding to the angular velocity of reel 10 comprises a disk 20 attached to shaft 11 with a light source 21 positioned on one side of disk 20 and a photodetector 22 positioned on the other side of disk 20. Disk 20 is provided with a plurality of apertures 23 so that, as reel 10 rotates, disk 20 also rotates to alternately block and pass the light beam 24 from light source 21 to photodetector 22 to thus develop a pulsed optical signal having a repetition rate that corresponds to the angular velocity of reel 10. Photodetector 22 converts the pulsed optical signal to a pulsed electrical signal having a repetition rate that systematically varies in accordance with the pulsed optical signal. A pulse-shaping circuit 30 converts the pulsed electrical signal from photodetector 22 to a rectangular-wave signal which is applied to a triggering circuit 40. Triggering circuit 40, in response to the rectangular pulse signal from pulse-shaping circuit 30, applies a control signal to recycle a generating circuit 50 and actuate a sampling circuit 70. Generating circuit 50 develops a periodic signal with each cycle having a voltage that changes at an essentially constant rate (often referred to as a "ramp" signal) to an extreme or maximum magnitude which is determined by the repetition rate of the control signal from triggering circuit 40, as described below in greater detail. The output of generating circuit 50 is applied to a holding circuit 60 which temporarily maintains the extreme value of the signal developed by generating circuit 50 immediately after it is recycled. Simultaneously, sampling circuit 70 is actuated by triggering circuit 40 to measure the value of the signal temporarily maintained by holding circuit 60 and to store a signal representative thereof. Sampling circuit 70 applies the stored signal to a motor control circuit 80 which controls the torque of AC torque motor 12 to thereby vary the torque applied to reel 10 in accordance with the angular velocity of the reel which, as discussed above, is inversely proportional to the diameter of the tape thereon.

In accordance with another aspect of the invention, an optional delay circuit 90 is employed to temporarily disable motor control circuit 80 for a period of time when the tape transport begins to move and accelerate the tape to a steady-state condition; that is, during the time required for the tape to attain its normal or quiescent operating speed when the transport is changed from an "off" or "standby" mode to a "play" or "record" mode. In accordance with a further aspect of the invention, an optional adjustable bias circuit 100 is provided to permit the constant tension system of the invention to function at different tape speeds.

More particularly, the embodiment of the invention illustrated in FIG. 1 comprises a pulse-shaping circuit 30 to change the relatively non-uniform pulses or "spikes" (wave-form 210 of FIG. 2) from photodetector 22 to relatively uniform rectangular pulses (waveform 225 of FIG. 2) suitable for application to triggering circuit 40. For this purpose, switching circuit 30 comprises a switching transistor 31 which is normally biased in the conductive or "on" state by the application of a suitable supply voltage V (e.g., +15 volts) to the base of switching transistor 31 by means of a biasing resistor 32 and a forward-biased diode 33. A second diode 34 is coupled between supply voltage V and the junction of resistor 32 and diode 33 by means of a biasing resistor 35 such that it is normally reverse biased. Each output pulse from photodetector 22, which may be generated by a phototransistor (not shown) biased to produce a negative output pulse each time the light beam is passed by one of apertures 23, causes diode 34 to become temporarily forward-biased which thereby decreases the voltage applied to the base of switching transistor 31 to cause it to go to the non-conductive or "off" state. Turning off switching transistor 31 causes its collector voltage to go from a low value to a high value, as shown by waveform 215 of FIG. 2, which causes switching transistor 36 to turn on, or become conductive. Alternately, when the light beam from light source 21 is not passed by one of apertures 23, diode 34 is reverse biased which permits diode 33 to conduct sufficient current to turn on switching transistor 31. Turning on switching transistor 31 causes its collector voltage to decrease to thereby turn off another switching transistor 36. Switching transistor 36 thus inverts the signal appearing at the collector of switching transistor 31, as shown by waveform 220 of FIG. 2. Transistors 31 and 36 employ a common emitter resistor 37 to provide a feedback signal which decreases their switching time. An impedance matching transistor 37 is operated in the common-collector mode with its base connected to the collector of switching transistor 36 to couple the output signal therefrom at a suitable impedance level to triggering circuit 40. A zener diode 38 is coupled between the collector of switching transistor 36 and the base of impedance-matching transistor 37 to protect switching transistor 36 from transient switching voltages. Consequently, for every pulse or "spike" from photodetector 22, a rectangular output pulse is developed by pulse-shaping circuit 30 and applied to triggering circuit 40.

At this point reference is made to FIG. 2 wherein it should be noted that the waveforms illustrated represent typical signals in the specific embodiment of the invention illustrated in FIG. 1. The waveforms begin at time to, which represents the time at which the circuit of FIG. 1 is first energized, and have a repetition rate that increases with time, which indicates that the system is operating in conjunction with a supply reel. The magnitude of the control voltage, waveform 270, thus decreases with time to decrease the torque of the reeling motor as the tape is unwound from the supply reel, as discussed in greater detail below.

Triggering circuit 40 is responsive to the pulse signal from pulse-shaping circuit 30 to simultaneously recycle generating circuit 50 and actuate sampling circuit 70 to measure the value of the ramp signal which is temporarily maintained by holding circuit 60. Triggering circuit 40 comprises a conventional JK flip-flop integrated circuit 41 (e.g., Motorola part number MC663P) having a pair of input terminals J,K and a corresponding pair of output terminals Q, $\bar{Q}$; a trigger terminal T; and a reset terminal SD. A suitable input voltage V (e.g., 15 volts) is applied to both J and K input terminals as well as to the reset terminal SD. In accordance with conventional flip-flop operation, the signal applied to input terminal J is normally conducted or transferred to output terminal Q (sometimes referred to as the "principal" output terminal) whereas the signal applied to input terminal K is normally not conducted or transferred to output terminal $\bar{Q}$ (sometimes referred to as the "complementary" output terminal). In response to the application of a pulse signal from pulse-shaping circuit 30 to trigger terminal T, however, the flip-flop operation is reversed; that is, the signal applied to input terminal J is not conducted to output terminal Q whereas the signal applied to input terminal K is conducted to output terminal $\bar{Q}$. As long as no signal is applied to reset terminal SD, flip-flop 41 remains in its present condition until the application of the next pulse from switching circuit 30 to trigger terminal T, which would case flip-flop 41 to return to its initial operating condition. With the continuous application of a suitable reset signal (e.g., voltage V) to reset terminal SD, however, flip-flop 41 is continuously returned to its initial condition in the absence of the application of the pulse signal from pulse-shaping circuit 30 to trigger terminal T. Consequently, by applying a rectangular pulse signal to trigger terminal T and a continuous signal to reset terminal SD, flip-flop 41 is shifted from its initial operating condition to its reverse operation condition only for the duration of each pulse applied to trigger terminal T. The waveform of the signals appearing at output terminals Q and $\bar{Q}$ are shown in FIG. 2 by waveform 230 and 255, respectively.

The base of a switching transistor 42 is connected to output terminal Q of flip-flop 41 and has its collector coupled to a suitable voltage source −V by a pair of collector resistors 44 and 46, which are series connected at junction 43, and its emitter connected to another suitable supply voltage V. The base of switching transistor 42 is connected to the junction of a voltage divider comprising the series combination of a pair of biasing resistors 48 and 49. When the signal at output terminal Q is zero (i.e., the signal applied to input terminal J is not conducted to output terminal Q), transistor 42 is biased on by biasing resistors 48 and 49 so that its collector voltage is relatively low. The voltage at junction 43 is correspondingly low, the precise value of which is determined by the values of load resistors 44 and 46. When the signal at output terminal Q is V, however, the voltage at the base of switching transistor 42 is increased sufficiently to turn off switching transistor 42, thereby causing its collector voltage to become approximately that of supply voltage −V. One output signal (waveform 235 of FIG. 2) of triggering circuit 40 is taken at junction 43 and applied to generating circuit 50 and the other output signal (waveform 260 of FIG. 2) is coupled from output terminal Q to sampling circuit 70 by a coupling capacitor 47.

Generating circuit 50 develops the aforementioned periodic ramp signal at a repetition rate determined by triggering circuit 40, which also determines the extreme value of the voltage of each cycle of the ramp signal (waveform 240 of FIG. 2). For the illustrated embodiment of the invention, generating circuit 50 develops a signal that increases at a constant rate to a maximum value although it is understood that comparable circuitry could be employed to develop a signal that decreases at a constant rate to a minimum value. Generating circuit 50 comprises a switching transistor 51 having its collector coupled to a suitable supply voltage V by means of a diode 52, timing resistor 53, and a switch 54 which connects one of two additional variable timing resistors 55 and 56, depending upon the speed of tape 13. Variable resistors 55 and 56 are each adjusted initially to a value suitable for a particular tape speed. The base of switching transistor 51 is coupled to junction 43 of triggering circuit 40 so that, as long as switching transistor 42 is off, the voltage at junction 43 is sufficiently low to maintain switching transistor 51 turned off. A storage capacitor 57 is coupled between the collector and emitter of switching transistor 51 and, as long as switching transistor 51 is turned off, storage capacitor 57 is charged by voltage V through diode 52 and the timing resistance of resistors 53 and 55 or 56. When switching transistor 42 of triggering circuit 40 is turned on, however, the voltage at junction 43 becomes less negative to an extent that turns on switching transistor 51 of generating circuit 50. Turning on switching transistor 51 short circuits the two terminals of storage capacitor 57, thereby discharging it. Thus, it can be seen that, for each pulse developed by photodetector 22, the ramp signal generated by generating circuit 50 is stopped at a maximum value determined by the time elapsed between two pulses (which corresponds to the repetition rate) and restarted at a predetermined initial value approximately equal to the voltage at the emitter of switching transistor 51 (e.g., −3 volts), as discussed immediately below.

In accordance with one aspect of the invention, an optional adjustable biasing circuit 100 is provided in the emitter circuit of transistor 51 to permit adjustment of the initial ramp voltage for each signal. Bias circuit 100 comprises an amplifying transistor 101 having its collector coupled to a suitable positive voltage source V by means of a load resistor 102 and having its emitter connected to a suitable negative voltage source −V. Transistor 101 is biased at a predetermined operating point by a voltage divider comprising the series combination of a biasing resistor 103 and one of a pair of variable biasing resistors 104, 105 are selected by a switch 106. Thus, switch 106 may be used to select either biasing resistor 104 or biasing resistor 106, each of which may be initially adjusted to suit a particular tape speed, and thereby change the initial value of the ramp voltage to suit the tape speed.

Holding circuit 60 temporarily maintains the voltage developed across storage capacitor 57 during the time that generating circuit 50 is recycled so that sampling circuit 70 has sufficient time to measure the maximum voltage of the ramp signal. For this purpose, holding circuit 60 comprises an amplifying transistor 61 having its emitter coupled to a suitable negative voltage source −VV (e.g., −12 volts) by means of an emitter resistor 62 and having its collector coupled to a suitable positive supply voltage V (e.g., 15 volts) by means of a collector resistor 63. The emitter of transistor 61 is also coupled to sampling circuit 70 by means of a coupling resistor 64. A complementary amplifying transistor 65 also has its base coupled to the output of generating circuit 50 and is biased by voltages V and −VV as shown. The emitter of transistor 65 is also coupled to the input of sampling circuit 70 by means of a coupling resistor 66. Emitter resistors 64 and 66 are connected at terminal S, the point to which the input of sampling circuit 70 is connected, so that the emitter signal of transistor 65 (waveform 245 of FIG. 2) and the emitter signal of transistor 61 (waveform 250 of FIG. 2) are combined at terminal S to produce a control signal (waveform 265 of FIG. 2), which is applied to sampling circuit 70. The emitter of transistor 65 is further coupled to the junction of diode 52 and collector resistor 53 of generating circuit 50 by a pair of parallel-connected storage capacitors 67 and 68 so that, when the recycling of generating circuit 50 occurs, storage capacitors 67 and 68 tend to maintain the voltage at terminal S at the value it had immediately prior to the recycling of switching circuit 50.

Sampling circuit 70 is responsive to a signal from triggering circuit 40 to measure the value of the signal temporarily held by holding circuit 60 and terminal S. For this purpose, sampling circuit 70 comprises a pair of switching transistors 71 and 72 having their emitters connected to each other and their bases coupled to each other by resistors 73 and 74. The junction of resistors 73 and 74 is coupled to the junction of the emitters of transistors 71 and 72 by means of the secondary winding of a transformer $T_{70}$. The primary winding of a transformer $T_{70}$ is coupled between a suitable supply voltage V and the $\bar{Q}$ or complementary output of flip-flop 41 by means of a switching transistor 75 and coupling capacitor 47. In response to the switching of flip-flop 41, which thereby conducts or transfers voltage V from input terminal J to output terminal $\bar{Q}$ and thus produces an impulse across coupling capacitor 47, switching transistor 75 is temporarily turned on to develop an impulse in the secondary of transformer $T_{70}$ which temporarily turns on switching transistors 71 and 72. Turning on transistor 71 and 72 permits storage capacitor 76 to charge to a voltage representative of that at terminal S of holding circuit 60. A pair of field effect transistors 77 and 78 are utilized to apply a control voltage corresponding to the voltage stored by storage capacitor 76 to motor control circuit 80. Field effect transistors 77 and 78 also present a relatively high impedance to storage capacitor 76 to minimize leakage therefrom.

Motor control circuit 80 is responsive to the output signal of sampling circuit 70 (waveform 270 of FIG. 2) to vary the voltage across the armature winding 14 of motor 12 to thereby vary its speed-torque characteristic. Motor control circuit 80 comprises a pair of amplifying transistors 81 and 82 and a full-wave diode rectifier bridge 83 coupled to the secondary winding of a transformer $T_{80}$. The primary winding of transformer $T_{80}$ is coupled between a suitable AC power source (e.g., 110 volts) and windings 14 and 15 of AC torque motor 12. Transformer $T_{80}$ applies an AC voltage to diode bridge 83 which couples a unidirectional voltage to the collector of transistor 82 by means of an on/off switch 86 a coupling diode 84. Transistor 81 is responsive to the output voltage from sampling circuit 70 to apply a bias voltage to the base of transistor 82 to thereby determine the operating point of transistor 82 which in turn determines the impedance presented to diode bridge 83. As the impedance presented to diode bridge 83 changes, the voltage across the primary winding of transformer $T_{80}$ changes accordingly to thus vary the voltage across armature winding 14, thereby changing the speed-torque characteristic of motor 12. In addition, a switch 85 is provided to connect different emitter resistors to transistor 82 to compensate for tape 13 being driven at different speeds. At this point it should be noted that switches 54, 85 and 106 may be mechanically coupled together, as well as to the actual speed-changing switch (not shown), so that they are operated simultaneously.

In accordance with another aspect of the invention, an optional delay circuit 90 is provided to prevent the operation of the constant-tension system of the invention when the tape transport is first operated to move the tape; that is, until the transport has time to attain its quiescent operating or "running" speed. Accordingly, a switch 91 (which may be preferably coupled to the "record" or "play" switch) is provided to open the circuit to ground from a timing capacitor 92 which is connected to the base of a unijunction transistor 93, Voltage V thus charges timing capacitor 92 at a rate determined by a series resistor 94 and, after a predetermined time has elapsed (e.g., 3 seconds), the voltage on timing capacitor 92 attains the firing voltage of unijunction transistor 93 to momentarily turn it on. Turning on unijunction transistor 93 actuates a conventional cross-coupled logic circuit 95 which functions as a bistable latching circuit to actuate a switching network 96 which thereby develops an enabling signal at a suitable impedance and current level to enable motor control circuit 90 by turning on transistor 81 through a coupling diode 97. When the transport is operated in standby or off mode, switch 91 is moved to short circuit timing capacitor 92 to ground and also cause an inverter 98 to reset logic circuit 95.

Thus there has been shown and described an improved electronic constant-tension tape-handling system. The system of the invention is particularly adaptable to a reel-to-reel tape transport and presents no mechanical loading to the tape. Moreover, it may be readily incorporated into an existing tape transport. The system may be used to control either the supply reel or the take-up reel or both.

It will, of course, be understood that modifications of the present invention, in its various aspects, will be apparent to those skilled in the art, some being apparent only after study, and others being merely matters of routine design. As such, the scope of the invention should not be limited by the particular embodiment and specific construction herein described, but should be defined only by the appended claims, and equivalents thereof.

Various features of the invention are set forth in the following claims.

What is claimed is:

1. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal, said generating means including a ramp generator which develops a periodic signal in which each cycle of said periodic signal has a voltage that increases at a constant rate to a maximum value determined by the repetition rate of the pulsed signal, said ramp generator including a switching transistor and a storage capacitor coupled from the collector to the emitter of said transistor, said transistor further having its base coupled to said pulsed electrical signal for alternately being turned on and off thereby and having its collector coupled to a supply voltage such that said storage capacitor is charged at a substantially constant rate when said transistor is turned off and said storage capacitor is discharged when said transistor is turned off;

sampling means coupled to said generating means for measuring said extreme value and storing a control signal representative thereof;

and motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes.

2. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal;

sampling means coupled to said generating means for measuring said extreme value and storing a control signal representative thereof;

motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes;

and an adjustable biasing circuit coupled to said generating means to permit adjustment of the initial voltage of said periodic signal.

3. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal;

sampling means coupled to said generating means for measuring said extreme value and storing a control signal representative thereof;

motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes;

and a holding means including a pair of complementary amplifying transistors having their emitters coupled together and further having a feedback capacitance coupled from the emitter of one of said amplifying transistors to said generating means.

4. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal;

sampling means coupled to said generating means for measuring said extreme value and storing a control signal representative thereof;

motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes;

and a storage capacitor and a pair of switching transistors responsive to said pulsed electrical signal for storing a voltage representative of said extreme value.

5. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal;

sampling means coupled to said generating means for measuring said extreme value and storing a control signal representative thereof;

motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes;

and a pair of amplifying transistors and a full-wave diode rectifier bridge coupled to the armature winding of said AC torque motor.

6. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal;

sampling means coupled to said generating means for measuring said extreme value and storing a control signal representative thereof;

motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes;

and a delaying circuit responsive to the initial energization of said constant-tension system for temporarily preventing operation of said system when tape transport is first operated to move the tape, said delaying circuit including a unijunction transistor timing circuit, a bistable latch circuit, and a switching network coupled to said motor control means.

7. An electronic system for applying substantially constant tension to the tape of a magnetic tape transport having a motor-driven tape-handling reel and wherein the tape is moved at a substantially constant rate and the diameter of the tape on the reel changes as the reel is rotated, comprising:

an AC torque motor having a speed-torque characteristic that varies in accordance with the voltage applied to the armature winding thereof for driving said reel;

photo-electric means coupled to said reel for generating a pulsed electrical signal having a repetition rate that systematically varies in accordance with the angular velocity of said reel;

generating means responsive to said pulsed signal for developing a periodic signal, each cycle of said periodic signal having a voltage that changes at a constant rate to an extreme value determined by the repetition rate of said pulsed signal;

sampling means coupled to said generating means for measuring said extreme value and storing a control signal representative thereof;

motor control means responsive to said control signal for applying a corresponding voltage to said armature winding of said AC motor to thus vary the torque of the AC motor in a systematic manner relative to the angular velocity of said reel to apply a substantially constant tension to the tape as the diameter of tape on the reel changes;

and a triggering circuit responsive to said pulsed signal from said photo-electric means for simultaneously causing the recycling of said generating means and actuating said sampling means, said triggering circuit including a JK flip-flop having a reset terminal and a reset signal continuously applied to said reset terminal.

* * * * *